No. 779,939. PATENTED JAN. 10, 1905.
J. HOVEY.
BEATER FOR THRESHING MACHINES.
APPLICATION FILED AUG. 25, 1904.

Witnesses
M. C. Lyddane.
C. H. Grissbauer.

Inventor
Joseph Hovey
by H. R. Wilson
Attorney

No. 779,939.

Patented January 10, 1905.

UNITED STATES PATENT OFFICE.

JOSEPH HOVEY, OF FLORIDA, OHIO, ASSIGNOR OF ONE-HALF TO EDWARD HUBER, OF MARION, OHIO.

BEATER FOR THRESHING-MACHINES.

SPECIFICATION forming part of Letters Patent No. 779,939, dated January 10, 1905.

Application filed August 25, 1904. Serial No. 222,127.

*To all whom it may concern:*

Be it known that I, JOSEPH HOVEY, a citizen of the United States, residing at Florida, in the county of Henry and State of Ohio, have invented certain new and useful Improvements in Beaters for Threshing-Machines; and I do declare the following to be a full, clear, and exact description of the invention, such as will enable others skilled in the art to which it appertains to make and use the same.

This invention relates to improvements in beaters for threshing-machines.

The object of the invention is to provide a beater for threshing-machines which will elevate, separate, and move the straw and grain along, means being provided whereby the straw is prevented from becoming wrapped upon the wings or blades of the beater.

A further object is to provide a device of this character which will be strong and durable in construction, efficient in operation, and well adapted to the purpose for which it is intended.

With these and other objects in view the invention consists of certain novel features of construction, combination, and arrangement of parts, as will be hereinafter more fully described, and particularly pointed out in the appended claims.

Figure 1:
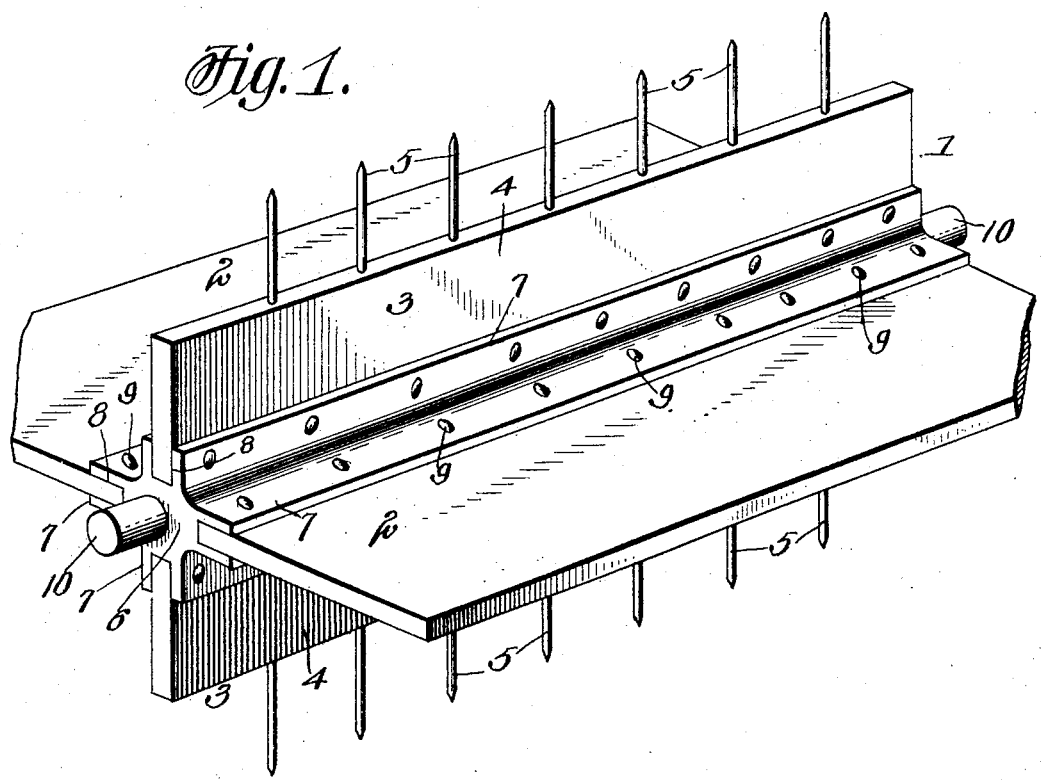
Figure 2:
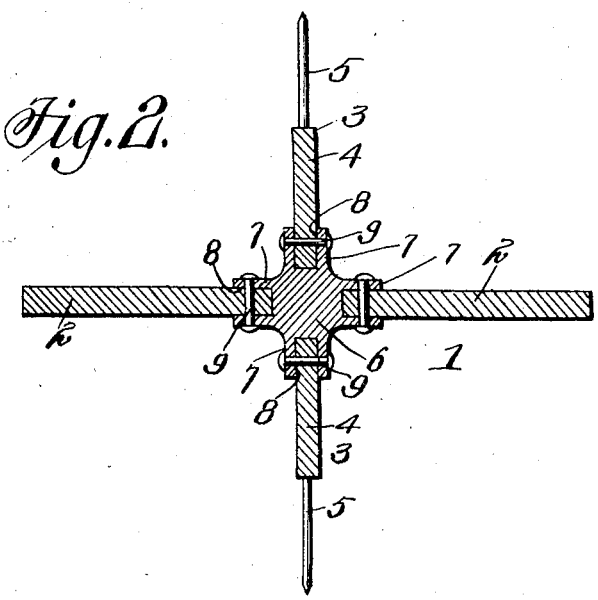

In the accompanying drawings, Figure 1 is a perspective view of a beater constructed in accordance with the invention, and Fig. 2 is a vertical transverse sectional view of the same.

Referring more particularly to the drawings, 1 denotes the beater, which consists of two or more longitudinally-disposed wings or blades 2 and 3, there being four of said blades shown in the present instance. The wings 2 are in the form of solid blades and arranged at diametrically opposite points, while the wings 3 are arranged diametrically opposite to each other and midway between the wings 2. The blades 4 of the wings 3 are narrower than the blades of the wings 2, and on the outer edges of the same are secured fingers or spikes 5. The combined length of the blade portion 4 and the fingers 5 makes the length of the wings 3 equal to that of the wings 2. The inner edges of the blades of the wings 2 and 3 are secured to a central hub 6 in any suitable manner, said hub being here shown as a casting having radially-disposed flanges 7, in which are formed grooves or channels 8, into which are inserted the inner edges of the blades, which are held therein by means of bolts or screws 9. On the outer ends of the hub 6 are formed stud shafts or spindles 10, by which said beater is journaled in the frame of the thresher. The fingers or spikes 5 may be arranged any suitable distance apart, but are preferably spaced at six inches along the outer edge of the blades 3.

In providing each alternate or certain of the blades of the beater with fingers or spikes the straw will be more effectually elevated and moved by the beater, while the interposing of solid blades between the fingered blades will prevent the straw from becoming wrapped around the wings of the beater and will thus keep the fingers or spikes of the other blades clean.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A revoluble beater for threshing-machines, having radial blades, each alternate blade being solid, and each intervening blade having a solid inner portion of less width than the first-mentioned blades and spikes projecting from the outer sides of said solid inner portion, the combined width of the solid inner portion of each intervening blade and the length of each of its spikes being equal to the width of each of the first-mentioned blades, substantially as described.

In testimony whereof I have hereunto set my hand in presence of two subscribing witnesses.

JOSEPH HOVEY.

Witnesses:
F. B. LEONHARDT,
C. B. DAVIS.